(12) United States Patent
Lim (10) Patent No.: US 12,380,891 B2
(45) Date of Patent: Aug. 5, 2025

(54) SPEECH RECOGNITION DEVICE FOR DENTISTRY AND METHOD USING THE SAME

(71) Applicant: DenComm Inc., Seoul (KR)

(72) Inventor: Byung Joon Lim, Seoul (KR)

(73) Assignee: DenComm Inc., Seoul (KR)

( * ) Notice: Subject to any disclaimer, the term of this patent is extended or adjusted under 35 U.S.C. 154(b) by 235 days.

(21) Appl. No.: 18/226,867

(22) Filed: Jul. 27, 2023

(65) Prior Publication Data

US 2024/0355330 A1 Oct. 24, 2024

(30) Foreign Application Priority Data

Apr. 20, 2023 (KR) .......................... 10-2023-0051940

(51) Int. Cl.
*G10L 15/26* (2006.01)
*G10L 15/06* (2013.01)

(52) U.S. Cl.
CPC ............ *G10L 15/26* (2013.01); *G10L 15/063* (2013.01)

(58) Field of Classification Search
CPC .......... G10L 15/08; G10L 15/16; G10L 15/26
See application file for complete search history.

(56) References Cited

U.S. PATENT DOCUMENTS

| 8,983,844 | B1 * | 3/2015 | Thomas | .................. G10L 15/20 704/226 |
|---|---|---|---|---|
| 10,650,809 | B2 | 5/2020 | Qian et al. | |
| 2018/0254039 | A1 | 9/2018 | Qian et al. | |

FOREIGN PATENT DOCUMENTS

KR 10-2018-0055234 A 5/2018

OTHER PUBLICATIONS

Seo Yong Sun, Translation of KR101015318B1, Feb. 15, 2011.*
Yin, Shi, Translation of WO2023283965A1, Jan. 19, 2023.*
Imad Qasim Habeeb, et al., "An ensemble technique for speech recognition in noisy environments", Indonesian Journal of Electrical Engineering and Computer Science, May 2020, pp. 835-842, vol. 18, No. 2.
Office Action issued from Korean Patent Application No. 10-2023-0051940 issued on Jun. 30, 2023.

* cited by examiner

*Primary Examiner* — Paras D Shah
(74) *Attorney, Agent, or Firm* — Sughrue Mion, PLLC (57) ABSTRACT

A speech recognition device for dentistry includes a processor, and a memory storing one or more instructions. The instructions are executed by the processor to obtain a sound containing noise and speech generated during a dental treatment, perform a noise cancelling on the sound, and run a speech-to-text (STT) model trained using a self-supervised learning method. The STT model executes extracting a feature from each of the sound with the noise cancelling and from the sound without the noise cancelling, obtaining an encoding vector by assigning a weight to each of the features and processing the features, and obtaining a script for the speech by decoding the encoding vector. Further, the self-supervised learning method includes a fine-tuning process in which sounds containing noises and speeches that are generated during the dental treatment and a script for each of the speeches are used as a training data.

18 Claims, 9 Drawing Sheets

SPEECH RECOGNITION DEVICE FOR DENTISTRY AND METHOD USING THE SAME

CROSS-REFERENCE TO RELATED PATENT APPLICATION

This non-provisional U.S. patent application is based on and claims priority under 35 U.S.C. § 119 of Korean Patent Application No. 10-2023-0051940 filed on Apr. 20, 2023, in the Korean Intellectual Property Office, the entire contents of which are hereby incorporated by reference.

BACKGROUND

1. Field

The present disclosure relates to a speech recognition device for dentistry and a method using the same.

2. Related Art

Recently, medical speech-to-text (STT), a technology that allows practitioners to dictate medical notes instead of typing them by recognizing and converting speech of the practitioners into text and reflects it in medical record charts, has been gaining attention. In particular, although conversations and spoken information exchanged between medical practitioners or between medical practitioners and patients during a patient encounter constitute unstructured data, they hold significant value in terms of documenting the patients' current status. Moreover, since such unstructured data can be further leveraged for predicting patients' prognosis, efforts have been made to accurately recognize and analyze such unstructured data with the aforementioned medical speech-to-text (STT) technology.

Similarly, in the field of dentistry, conversations and spoken information exchanged between dental practitioners or between dental practitioners and patients are also recognized as important.

However, dental treatments may involve relatively louder noises compared to treatments in other medical fields. For example, the operation of dental tools such as a dental drill or a dental suction device can generate distinctive noises. Similarly, the process of placing a dental filling may also produce characteristic noises.

In the presence of such noise, the dental practitioners may rely on conversations to share information about a patient's condition or verbally communicate treatment requests for their colleagues.

Therefore, there is a demand for a technique that can accurately recognize speech even in situations where such noise occurs.

RELATED ART

Patent Document: Korean Patent Application Publication No. 10-2022-0095581 (published on Jul. 7, 2022)

SUMMARY

In view of the above, embodiments of the present disclosure provides a technique of accurately recognizing speech exchanged between dental practitioners or between the dental practitioners and patients, despite the noise generated during dental treatments.

It is to be understood, however, that the object of the present disclosure is not limited to those mentioned above. Other objects not mentioned above will be clearly understood by those skilled in the art from the following description.

In accordance with an aspect of the present disclosure, there is a speech recognition device for dentistry including a processor, and a memory storing one or more instructions. The instructions are executed by the processor to obtain a sound containing noise and speech generated during a dental treatment, perform a noise cancelling on the sound, and run a speech-to-text (STT) model trained using a self-supervised learning method. The STT model executes extracting a feature from each of the sound with the noise cancelling and from the sound without the noise cancelling, obtaining an encoding vector by assigning a weight to each of the features and processing the features, and obtaining a script for the speech by decoding the encoding vector. Further, the self-supervised learning method includes a fine-tuning process in which sounds containing noises and speeches that are generated during the dental treatment and a script for each of the speeches are used as a training data.

Further, the noise cancelling process may be performed by a model that performs speech enhancement.

Further, in the noise cancelling process, at least one of spectral subtraction, Wiener filtering, and adaptive filtering may be performed.

Further, in the process of extracting the feature from the sound with the noise cancelling process and the feature from the sound without the noise cancelling process, each of the sound with the noise cancelling process and the sound without the noise cancelling process may be converted into a spectrogram, and each of the features be extracted from the corresponding spectrogram by using a convolutional neural network.

Further, the predetermined weight may be assigned such that a higher value is assigned to a part that is relatively similar and a lower value is assigned to a part that is not relatively similar between the sound with the noise cancelling process and the sound without the noise cancelling process.

Further, an encoding part included in the STT model may perform the process of extracting the feature from the sound with the noise cancelling process and the feature from the sound without the noise cancelling process and the process of obtaining the encoding vector, and the encoding part may be trained using a plurality of sounds containing speeches and noises through a pre-training process included in the self-supervised learning method.

Further, in the pre-training process for the encoding part, a sound containing speech and noise may be used as an input data for training, and a sound containing speech may be used as a label data for training.

Further, in a pre-training process for the encoding part, the noise cancelling process may be performed on the sound containing the speech and the noise that serves as the input data for training so that the sound with the noise cancelling process and the sound without the noise cancelling process may be generated, a feature is extracted from the sound serving as the input data for training on which the noise cancelling process is not performed and a feature is extracted from the sound serving as the input data for training on which the noise cancelling process may be performed, an encoding vector for training may be obtained by assigning a predetermined weight to each of the feature extracted from the sound serving as the input data for training on which the noise cancelling process is not performed and the feature extracted from the sound serving as the input data for training on which the noise cancelling process is performed, and processing the features, and a training may be performed such that a difference between the encoding vector for training and a feature vector to which an extracted feature for the label data for training is converted is minimized.

Further, contrastive loss may be used for the training performed to minimize the difference between the encoding vector for training and the feature vector.

Further, a decoding part included in the STT model may perform the process of obtaining the script for the speech by decoding the obtained encoding vector, and in the fine-tuning process, a training may be performed such that a difference between a result outputted from the decoding part and the script serving as the training data is minimized, the result being outputted in response to the encoding part being provided with the plurality of sounds containing the noises and the speeches generated during the dental treatment.

Further, connectionist temporal classification (CTC) loss may be used for the training performed to minimize the difference between the result outputted from the decoding part and the script serving as the training data.

Further, the one or more instructions, when executed by the processor, cause the processor to provide, if the script includes a word that is not in a dictionary, three consecutive words including the word that is not in the dictionary to a trained word correction model, and the word that is not in the dictionary may be replaced with a word corrected by the trained word correction model.

In accordance with another aspect of the present disclosure, there is a speech recognition method for dentistry that is performed by a speech recognition device for dentistry. The speech recognition method may include obtaining a sound containing noise and speech generated during a dental treatment, performing a noise cancelling process on the obtained sound so that the sound with the noise cancelling process and the sound without the noise cancelling process are generated and running a speech-to-text (STT) model trained using a self-supervised learning method, the STT model executing a process of extracting a feature from the sound with the noise cancelling process and a feature from the sound without the noise cancelling process, a process of obtaining an encoding vector by assigning a predetermined weight to each of the extracted features and processing the features, and a process of obtaining a script for the speech by decoding the obtained encoding vector. The self-supervised learning method includes a fine-tuning process and, in the fine-tuning process, a plurality of sounds containing noises and speeches that are generated during the dental treatment and a script for each of the plurality of speeches are used as a training data.

Further, the noise cancelling process may be performed by a model that performs speech enhancement.

Further, in the noise cancelling process, at least one of spectral subtraction, Wiener filtering, and adaptive filtering may be performed.

Further, in the process of extracting the feature from the sound with the noise cancelling process and the feature from the sound without the noise cancelling process, each of the sound with the noise cancelling process and the sound without the noise cancelling process may be converted into a spectrogram, and each of the features may be extracted from the corresponding spectrogram by using a convolutional neural network.

Further, the predetermined weight may be assigned such that a higher value is assigned to a part that is relatively similar and a lower value is assigned to a part that is not relatively similar between the sound with the noise cancelling process and the sound without the noise cancelling process.

Further, an encoding part may include in the STT model performs the process of extracting the feature from the sound with the noise cancelling process and the feature from the sound without the noise cancelling process and the process of obtaining the encoding vector, and the encoding part may be trained using a plurality of sounds containing speeches and noises through a pre-training process included in the self-supervised learning method.

Further, in the pre-training process for the encoding part, a sound containing speech and noise may be used as an input data for training, and a sound containing speech is used as a label data for training.

According to the embodiments, features are extracted from a sound containing speech and noise and also from a refined result of such sound, a weighted average result is then derived for the extracted features, followed by the generation of an encoding vector from the weighted average result. Finally, the generated encoding vector is decoded to obtain the text.

As a result, accurate speech recognition is achievable even in noisy environments. In other words, it is possible to implement a high-accuracy STT model (STT model with a high recognition rate) specifically designed for dentistry.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that the detailed description of related known components or functions unnecessarily obscures the gist of the present disclosure, the detailed description thereof will be omitted. Further, the terminologies to be described below are defined in consideration of the functions of the embodiments of the present disclosure and may vary depending on a user's or an operator's intention or practice. Accordingly, the definition thereof may be made on a basis of the content throughout the specification.

Figure 1:
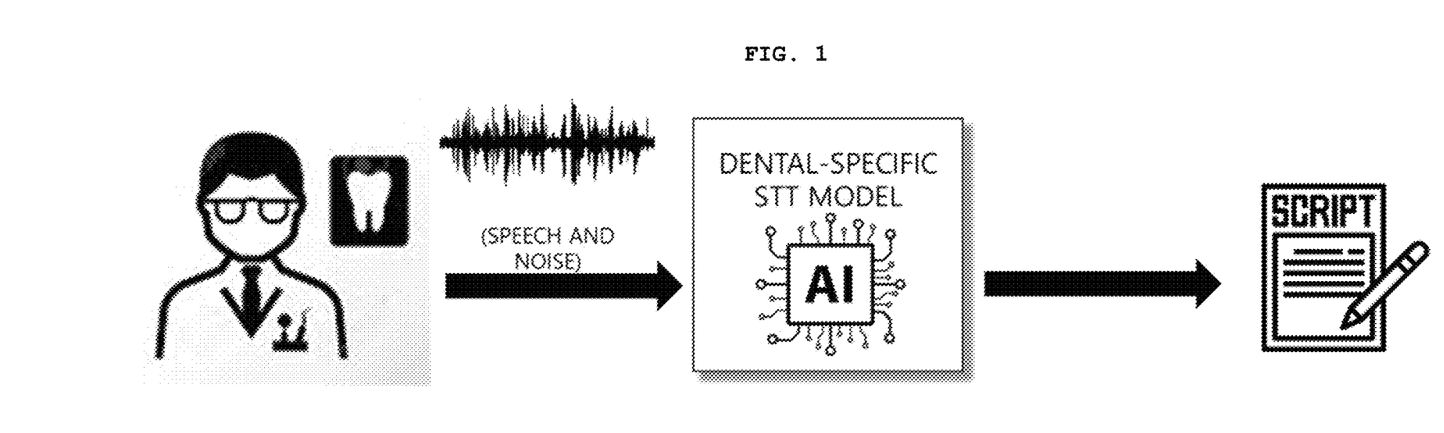
FIG. 1 conceptually illustrates a configuration in which a speech-to-text (STT) model specifically designed for dentistry according to an embodiment is employed to recognize speech from sounds generated in a dental clinic, converts the recognized speech into text, and delivers it as output.

FIG. 1 conceptually illustrates a configuration in which a speech-to-text (STT) model specifically designed for dentistry (hereinafter, also referred to as a "dental-specific STT model") according to an embodiment is employed to recognize speech from sounds generated in a dental clinic, converts the recognized speech into text, and delivers it as output. It should be noted that FIG. 1 is merely an example to illustrate the technical scope of the present disclosure. Therefore, the present disclosure should not be construed as limited to those illustrated in FIG. 1.

Referring to FIG. 1, sounds generated during dental treatment are provided to the dental-specific STT model. These sounds may include speech and noise. The speech generated during the dental treatment may include conversations (spoken words) between dental practitioners or between dental practitioners and patients. Further, various type of noise may also be generated during the dental treatment. For example, a dental drill or a dental suction device may produce a characteristic noise. As another example, a dental filling may also produce a characteristic noise. Such noises may further include car horns outside a dental clinic.

Thus, the aforementioned sounds may be in the form of a noisy waveform as shown in FIG. 1. In other words, the aforementioned sounds may include noise and speech. These sounds are provided to the dental-specific STT model according to the embodiment of the present disclosure. Then, through the STT model for dentistry, the speech included in the sounds is recognized and outputted. The output can take many forms. For example, a text such as a script may be outputted as shown in FIG. 1, but is not limited thereto.

In the embodiment, the dental-specific STT model is trained to be robust to noise. For example, the dental-specific STT model is trained to accurately recognize and output the speech contained in the sounds while the noise is also generated during the dental treatment. That is, compared to a general STT model, the dental-specific STT model according to the embodiment may be trained to have a relatively high speech recognition rate despite the presence of significant noise.

Meanwhile, the techniques applied to the dental-specific STT model described above can also be applied to other medical fields. Specifically, depending on the type of training data used in a fine-tuning process, an STT model in association with pediatrics, obstetrics and gynecology, ophthalmology, or dermatology can also be implemented using the techniques according to the embodiment.

Figure 2:
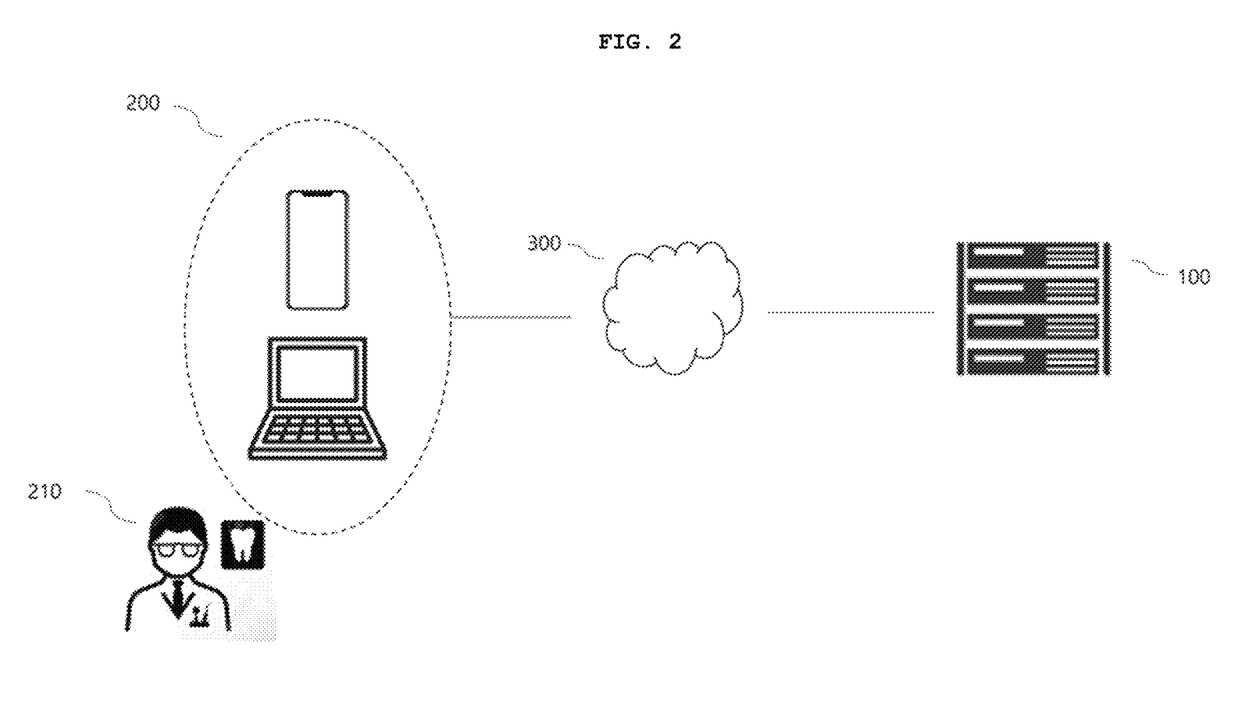
FIG. 2 illustrates an example of a configuration in which a speech recognition device for dentistry according to the embodiment is connected on a network.

FIG. 2 illustrates an example of a configuration in which a speech recognition device for dentistry (hereinafter, also referred to as a "dental speech recognition device") according to the embodiment is connected on a network.

Referring to FIG. 2, the dental speech recognition device 100 according to the embodiment may be connected to a user terminal 200 and the like through a network 300. It should be noted that FIG. 2 is merely an example to illustrate the technical scope of the present disclosure. Therefore, the present disclosure should not be construed as limited to those illustrated in FIG. 2.

Here, the network 300 may be a wireless network or a wired network. The wireless network may include, for example, at least one of long-term evolution (LTE), LTE Advance (LTE-A), code division multiple access (CDMA), wideband CDMA (WCDMA), universal mobile telecommunications system (UMTS), wireless broadband (WiBro), wireless fidelity (WiFi), Bluetooth, near field communication (NFC), and global navigation satellite system (GNSS). The wired network may include, for example, at least one of universal serial bus (USB), high definition multimedia interface (HDMI), recommended standard 232 (RS-232), local area network (LAN), wide area network (WAN), Internet and telephone network.

Next, the user terminal 200 refers to a terminal of a user who wishes to use the dental speech recognition device 100 described above. For example, the user terminal 200 may be a terminal of a dental staff or a terminal of a patient. Alternatively, the user terminal 200 may be a terminal of a third-party data provider who collects sounds containing speeches and noises that are generated in the dental clinic and builds medical big data from the collected sounds.

As shown in FIG. 2, the user terminal 200 may include a smart phone, a tablet PC, a desktop PC, or a server. However, the user terminal 200 is not limited thereto. In addition, the user terminal 200 may be equipped with a speech recognition device such as a microphone, and a communication unit. The sounds generated in the dental clinic may be inputted to the user terminal 200 through the speech recognition device such as the microphone. Further, the communication unit may transmit the sounds inputted to the user terminal 200 to the dental speech recognition device 100 according to the embodiment through the network 300.

The dental speech recognition device 100 receives all the sounds generated in the dental clinic. These sounds may be generated during the dental treatment, but are not limited thereto. These generated sounds may include speeches (voices) and noises. Here, since the speech and the noise have already been discussed, an additional description thereof will be omitted.

The dental speech recognition device 100 analyzes the received sounds to recognize the speech only. The recognized speech is then outputted in the form of text, such as a script (that is, the recognized speech is converted into text). More specifically, even if the noise is generated during the dental treatment, the dental speech recognition device 100 is configured to accurately recognize the speech contained in the sounds and output the recognized speech in the form of a script. In other words, compared to a general STT model, even with the severe noise, the dental speech recognition device 100 according to the embodiment can accurately recognize the speech and output the recognized speech in the form of the script.

Hereinafter, the dental speech recognition device 100 will be described in more detail.

Figure 3:
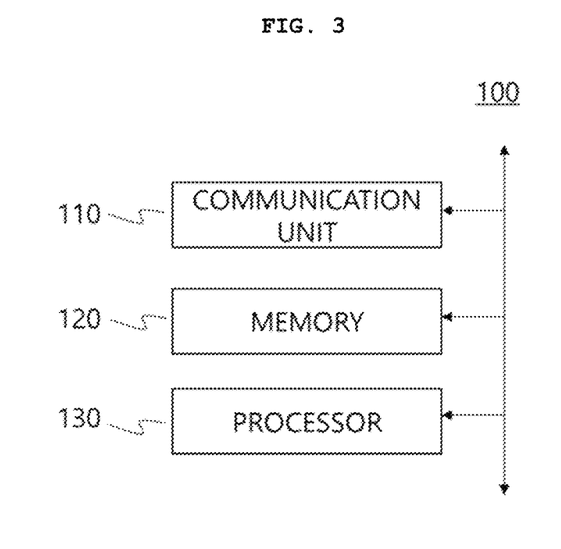
FIG. 3 conceptually illustrates an example of a block diagram of the speech recognition device for dentistry according to the embodiment.

FIG. 3 schematically illustrates an example of a block diagram of the dental speech recognition device 100 according to the embodiment. Referring to FIG. 3, the dental speech recognition device 100 includes a communication unit 110, a memory 120, and a processor 130. However, a configuration shown in FIG. 3 is merely an example to illustrate the technical scope of the present disclosure. Therefore, the present disclosure should not be construed as limited to those in the configuration shown in FIG. 3. For example, the dental speech recognition device 100 may include at least one component that is not shown in FIG. 3 or may not include at least one component shown in FIG. 3.

The communication unit 110 may be implemented by a wired communication module or a wireless communication module. The dental speech recognition device 100 may communicate with external terminals, such as the various types of terminals 200 shown in FIG. 2, through the communication unit 110.

The memory 120 may be implemented by an information storage medium. The information storage media may include at least one of a flash memory, a hard disk, a multimedia card micro type memory, a card type memory (e.g., an SD memory, an XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk and/or the like. However, the information storage media is not limited thereto.

The memory may store various kinds of information. For example, the memory 120 may store information obtained by the dental speech recognition device 100 from external terminals such as the user terminals 200 or the like through the communication unit 110. Further, the memory 120 may store a plurality of training data that may be utilized for training various types of models or modules to be described later.

In addition, the memory 120 may have various types of modules or models implemented therein. When such modules or models are executed by the processor 130 to be described later, desired functions are performed. Each of the modules or the models will be described later.

Next, the processor 130 will be described in detail. First, the processor 130 according to the embodiment may execute at least one instruction stored in the memory 120 to perform technical features according to the embodiment of the present disclosure that will be described later.

In the embodiment, the processor 130 may include at least one core. Further, the processor 130 may be a central processing unit (CPU), a general purpose graphics processing unit (GPGPU), a tensor processing unit (TPU), and the like to perform for data analysis and/or data processing.

The processor 130 may train a neural network or a model that is designed by a machine learning or a deep learning. To this end, the processor 130 may perform computations for training the neural network, such as processing input data for training, extracting features from the input data, calculating errors, and updating the weights of the neural network using backpropagation.

The processor 130 may also perform inference for a predetermined purpose by using a model implemented in an artificial neural network method.

Hereinafter, an artificial neural network will be described. A model in the specification may indicate any type of computer program that operates based on a network function, an artificial neural network, and/or a neural network. In the specification, the terms "model," "neural network," "network function," and "neural network" may be used interchangeably. In the neural network, one or more nodes are interconnected through one or more links to form an input node and output node relationship in the neural network. Characteristics of the neural network may be determined based on the number of nodes and links, the connections between the nodes and the links, and the weight assigned to each link in the neural network. The neural network may be comprised of a set of one or more nodes. A subset of the nodes that make up the neural network may constitute a layer.

Figure 4:
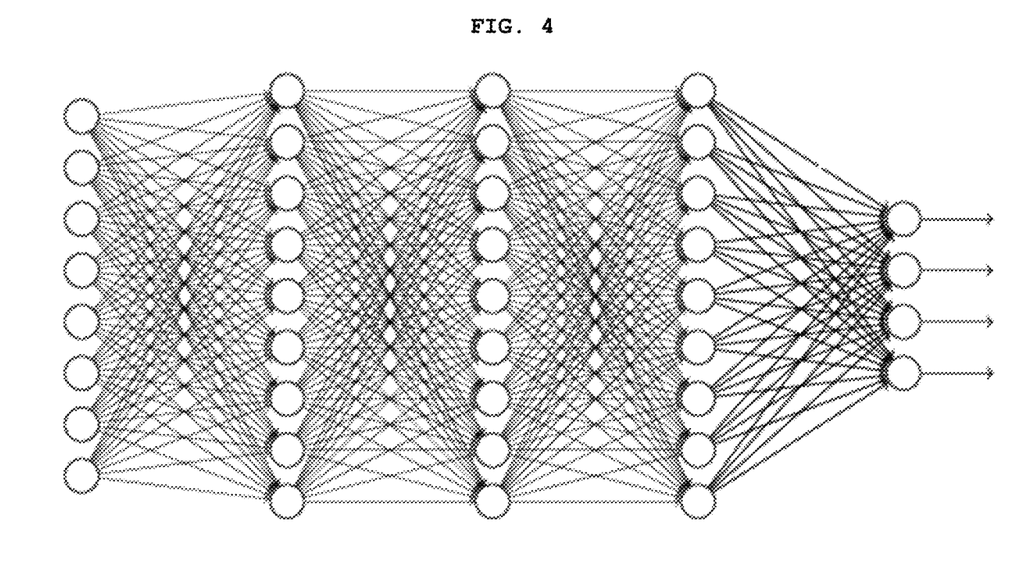
FIG. 4 conceptually illustrates a deep learning architecture.

Among neural networks, a deep neural network (DNN) may refer to a neural network that includes a plurality of hidden layers in addition to an input layer and an output layer. As shown in FIG. 4 that illustrates the concept of having intermediate hidden layers in the deep neural network, the deep neural network may include one or more, preferably two or more, hidden layers.

The deep neural network may include a convolutional neural network (CNN), a recurrent neural network (RNN), a long short-term memory (LSTM) network, a generative pre-trained transformer (GPT), an autoencoder, a generative adversarial network (GAN), a restricted boltzmann machine (RBM), a deep belief network (DBN), a Q network, a U network, a Siamese network, a transformer, and the like.

The deep neural network described above may be trained using a transfer learning method. In the transfer learning method, a pre-training process and a fine-tuning process are performed.

Here, in the pre-training process, a large amount of unlabeled training data is used to train the model to be suitable for the first task. As a result, a pre-trained model (or base model) is obtained.

Further, in the fine-tuning process, labeled training data is used to train the model to be suitable for the second task using supervised learning. As a result, the desired final model is obtained through the transfer learning method.

Examples of models trained with this transfer learning approach include, but are not limited to, bidirectional encoder representations from transformers (BERT).

The neural network, including the deep neural network described above, may be trained to minimize output errors. In the training process of the neural network, the training data are repeatedly inputted to the neural network. Then, the output of the neural network for the training data is compared with the target output, and the error therebetween is calculated. The error is then backpropagated from the output layer to the input layer of the neural network, updating the weights of each node in the neural network to reduce the error.

Meanwhile, the model according to the embodiment may be implemented by adopting at least a portion of a transformer architecture. Here, the transformer may include an encoder that encodes embedded data and a decoder that decodes the encoded data. The transformer may have a structure that receives a sequence of data and outputs a sequence of data of different types through encoding and decoding steps. In the embodiment, the sequence of data may be processed and prepared into a form operable by a transformer. The process of processing the sequence of data into a form operable by the transformer may include an embedding process. Representations such as data tokens, embedding vectors, and embedding tokens may refer to the embedded data in the form that can be processed by the transformer.

In order for the transformer to encode and decode the sequence of data, the encoders and the decoders within the transformer may utilize an attention algorithm. Here, the attention algorithm refers to an algorithm that that calculates the similarity between one or more keys and a given query, reflects this similarity onto the corresponding values associated with each key, and computes an attention value by taking a weighted sum of the values that have been adjusted based on the calculated similarity.

Depending on how the query, keys, and values are set, various types of attention algorithms can be classified. For example, when the query, keys, and values are all set to be the same to obtain the attention, it can refer to a self-attention algorithm. On the other hand, in order to process a sequence of input data in parallel, the embedding vectors can be dimensionally reduced, and individual attention heads can be obtained for each partitioned embedding vector. This approach is known as multi-head attention algorithm.

In one embodiment, a transformer may include modules that perform multiple multi-head self-attention algorithms or multi-head encoder-decoder algorithms. Additionally, the transformer in one embodiment may include additional components such as embedding, normalization, or softmax, apart from attention algorithms. The method of constructing the transformer using attention algorithms may include the approach described in "Attention Is All You Need" by Vaswani et al., presented at the 2017 NIPS conference, which is hereby incorporated by reference.

The transformer can be applied to various data domains, including embedded natural language, segmented image data, or audio waveforms. As a result, the transformer can convert a sequence of input data into a sequence of output data. Data with different data domains can be transformed to make them processable by the transformer, which is referred to as embedding.

Moreover, the transformer can process additional data that represents the relative positional relationships or phase relationships between a sequence of input data. Alternatively, the sequence of input data may be embedded with additional vectors representing the relative positional relationships or phase relationships between the input data. In one example, the relative positional relationships between the sequence of input data may include, but is not limited to, the word order within a natural language sentence, the relative positions of segmented images, or the temporal order of segmented audio waveforms. The process of incorporating information that represents the relative positional relationships or phase relationships between the sequence of input data is referred to as positional encoding.

Hereinafter, various operations or functions that the dental speech recognition device 100 may perform by executing at least one instruction stored in the memory 120 by the processor 130 will be described.

First, the processor 130 may control the communication unit 110. Thereafter, the dental speech recognition device 100 may obtain information by performing communication with the user terminal 200 shown in FIG. 2 through the communication unit 110.

The processor 130 may also read the aforementioned data or instructions stored in the memory 120, and may write new data or instructions to the memory 120. Additionally, the processor 130 may modify or delete data or instructions that have already been written.

Further, the processor 130 may execute various models or modules stored in the memory 120. Here, these models or modules may be implemented by the above-described artificial neural network method or a rule-based method. Specifically, the dental speech recognition device 100 may execute, by the processor 130, the dental-specific STT model illustrated in FIG. 1 (hereinafter, referred to as the "STT model") stored or implemented in the memory 120. Hereinafter, the STT model will be described.

The STT model according to the embodiment may be implemented by the transformer. Specifically, the STT model may be implemented by a sequence-to-sequence transformer. The sequence-to-sequence transformer differs from the conventional transformer in that a decoder-encoder attention is used in a decoder.

Figure 5:
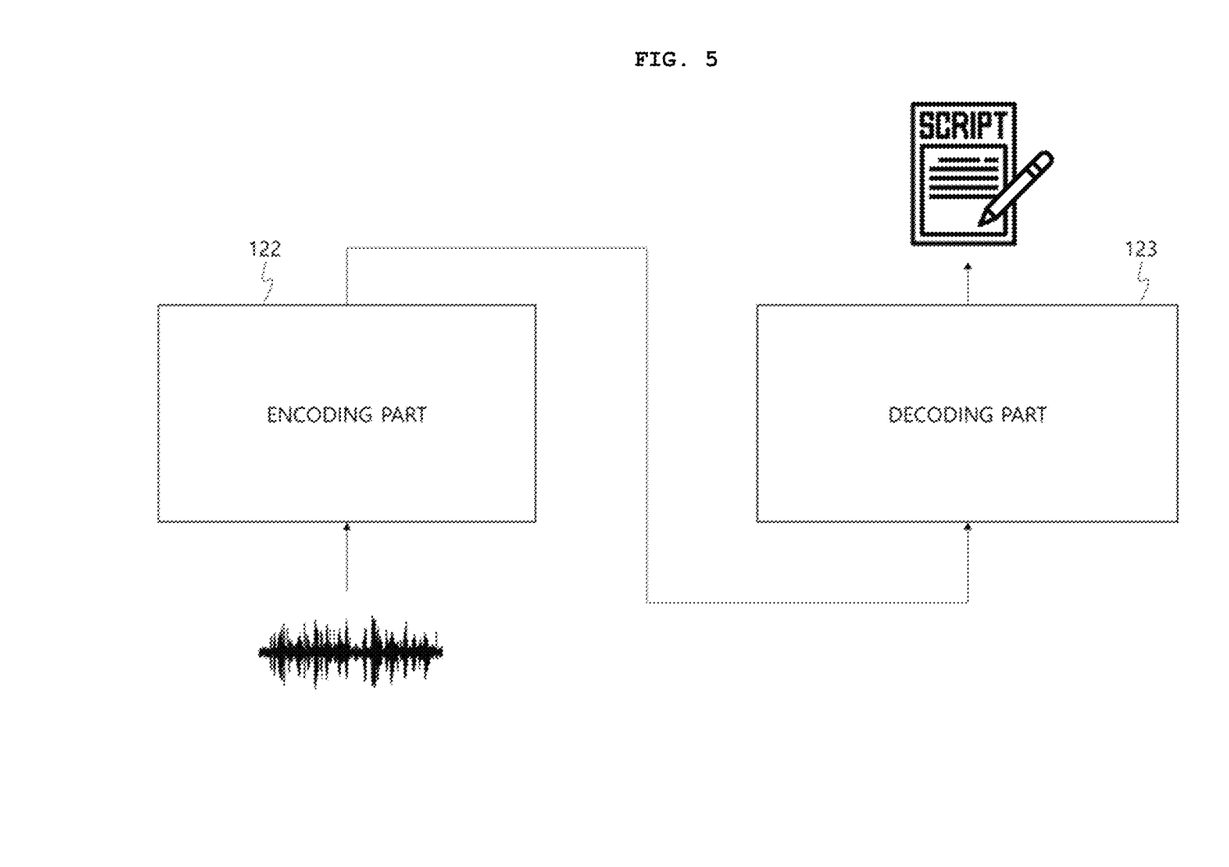
FIG. 5 conceptually illustrates an architecture of the STT model implemented according to the embodiment.

An example of the architecture of the STT model is illustrated in FIG. 5. Referring to FIG. 5, the STT model includes an encoding part 122 and a decoding part 123. The encoding part 122 is configured to receive and encode a sound, specifically a noisy waveform, which contains speech and noise. The decoding part 123 is configured to receive an encoding vector from the encoding part 122, convert the encoding vector into text such as a script, and output the converted text. That is, when the aforementioned sound is provided to the encoding part 122, the encoding part 122 generates the encoding vector. The encoding vector thus generated is then provided to the decoding part 123. Subsequently, the decoding part 123 utilizes the received encoding vector to generate and output a script corresponding to the speech contained in the sound.

Figure 6:
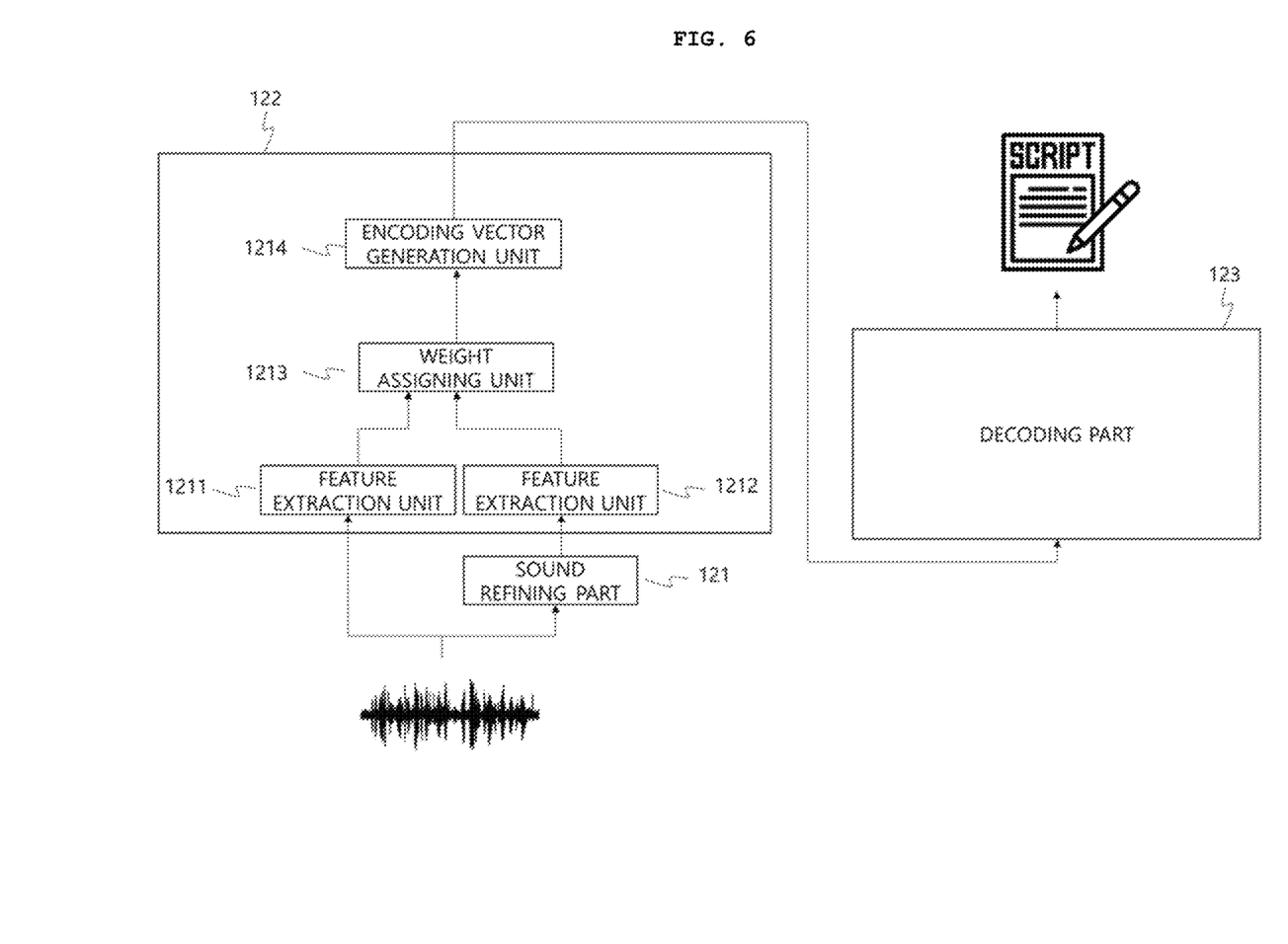
FIG. 6 conceptually illustrates an architecture of an STT model implemented according to another embodiment.

Meanwhile, the architecture of the STT model according to the embodiment is not limited to that shown in FIG. 5. For example, the STT model may be implemented in the form of the architecture shown in FIG. 6. Referring to FIG. 6, the STT model may be implemented to mainly include a sound refining part 121, the encoding part 122, and the decoding part 123. In FIG. 6, the encoding part 122 may be configured to include, but is not limited to, feature extraction units 1211 and 1212, a weight assigning unit 1213, and an encoding vector generation unit 1214.

Hereinafter, the configuration of FIG. 6 will be described in more detail. The sound refining part 121 is configured to cancel the noise contained in the sound. The sound refining part 121 may be implemented by a model that performs speech enhancement. The speech enhancement refers to a technique for clarifying speech signals contained in the sound.

Various techniques may be used in the speech enhancement. For example, in the speech enhancement, at least one of spectral subtraction, Wiener filtering, and adaptive filtering, but not limited thereto, may be performed.

Among these, the spectral subtraction refers to one of the techniques for removing background noise from the sound. Specifically, when the spectral subtraction is applied, a frequency spectrum of a speech signal and a spectrum of background noise are analyzed, and then a signal component in a frequency band where the noise is present is reduced. Therefore, the background noise can be reduced, and thus the speech signal can be clear.

Further, the Wiener filtering also refers to one of the techniques for removing noise from the sound. Specifically, in the Wiener filtering, the statistical properties of the speech signal and the noise signal are analyzed, and then the noisy part is removed. Thus, the speech signal can be clear. The Wiener filtering can be applied in the time domain or the frequency domain. The Wiener filtering is more effective when used in conjunction with other filtering techniques.

Lastly, the adaptive filtering is one of the techniques used to remove noise from the speech signal and improve the quality of the speech signal. Specifically, in the adaptive filtering, the noise is separated from the speech signal by adjusting filtering weights in real time to thereby easily remove the noise.

To the encoding part 122, the sound containing speech and noise and also the result of a process in which the noise has been cancelled from the sound are inputted. In other words, the sound that is a recognition target and also the noise cancelling sound are inputted to the encoding part 122 according to the embodiment.

Then, a feature is extracted from each of the feature extraction units 1211 and 1212 included in the encoding part 122. Specifically, the feature extraction unit 1211 may extract a feature from the sound on which the noise cancelling process has not been performed. Further, the feature extraction unit 1212 may extract a feature from the sound on which the noise cancelling process has been performed. Unlike the encoding part 122 shown in FIG. 6 that includes the two feature extraction units 1211 and 1212, the encoding part 122 may include a single feature extraction unit. In this case, the single feature extraction unit may extract both of a feature from the sound without the noise cancelling process and a feature from the sound with the noise cancelling process.

The two extracted features may be different from each other since one feature is extracted from the sound with the noise cancelling process, while the other feature is extracted from the sound without the noise cancelling process. If these two features are compared in terms of frequency, there may be identical parts and non-identical parts. The identical parts indicate parts of the sound that are not affected by the noise or are relatively less affected by the noise, and the non-identical parts indicate parts of the sound that are affected by the noise or are relatively more affected by the noise. The identical parts and the non-identical parts can be used in a learning process called feature sharing.

Next, the feature extraction units 1211 and 1212 will be described in more detail. As described above, each of the feature extraction units 1211 and 1212 receives the sound. Then, each of the feature extraction units 1211 and 1212 converts this input sound into a spectrogram. That is, in each of the feature extraction units 1211 and 1212, the sound signal is transformed into a frequency domain. The transformation may use a technique such as, but not limited to, the short-time Fourier transform (STFT). Then, the feature is extracted from the spectrogram in each of the feature extraction units 1211 and 1212. For feature extraction, a feature extraction technique used in convolutional neural network (CNN) may be used, but is not limited thereto.

The two features from the feature extraction units 1211 and 1212 are inputted to the weight assigning unit 1213. Then, in the weight assigning unit 1213, a weighted average value of these two features is calculated. Specifically, the weight assigning unit 1213 may determine weights such that similar portions of the two features are relatively emphasized and dissimilar portions of the two features are relatively de-emphasized. That is, the weights may be determined in a way that the weights has higher values for the similar parts and lower values for the dissimilar parts. This allows the more important part of the two features to be emphasized, while the less important part may be removed or faded.

By providing the weight assigning unit 1213 according to the embodiment, the speech and the noise can be clearly separated even in the presence of loud noise. Thus, the STT model according to the embodiment may have a high speech recognition rate. Here, the determination and assignment of weights by the weight assigning unit 1213 may be based on an attention fusion technique, but is not limited thereto.

The weighted average value calculated by the weight assigning unit 1213 is inputted to the encoding vector generation unit 1214. The encoding vector generation unit 1214 is configured to generate and output, as an encoding vector, features of the residual part of the sound after the noise is removed from the sound containing the speech and the noise. That is, the input of the encoding vector generation unit 1214 is the weighted average value, and the output of the encoding vector generation unit 1214 is the encoding vector that is a vector obtained by encoding the features of the speech of the sound from which the noise has been removed.

The decoding part 123 receives the encoding vector generated and outputted by the encoding vector generation unit 1214 from the encoding part 122. Then, the decoding part 123 generates text such as a script from the encoding vector through a decoding process using a predetermined algorithm and outputs the generated text. Here, the process of generating and outputting the text such as the script from the encoding vector through the decoding process is a well-known technique. Thus, a detailed description thereof will be omitted.

Therefore, according to the embodiment, the features are extracted from the sound containing speech and noise and also from the refined result of such sound, the weighted average results are then derived for the extracted features, followed by the generation of encoding vectors from the weighted average result. Finally, the generated encoding vectors are decoded to obtain the text.

As a result, accurate speech recognition is achievable even in noisy environments. In other words, it is possible to implement a high-accuracy STT model (STT model with a high recognition rate) specifically designed for dentistry.

Hereinafter, the learning process of the STT model will be described in detail.

Figure 7:
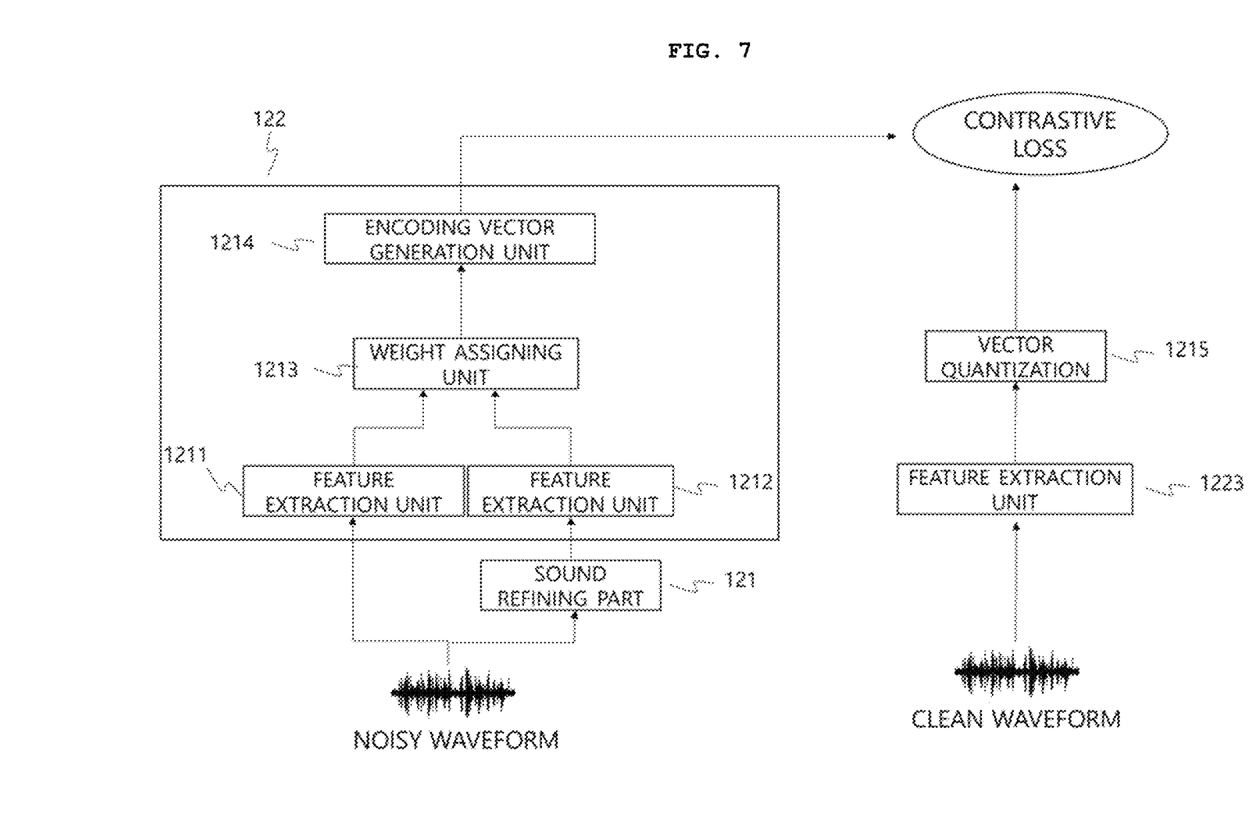
FIG. 7 conceptually illustrates a process for pre-training the encoding part of the STT model according to the embodiment.
Figure 8:
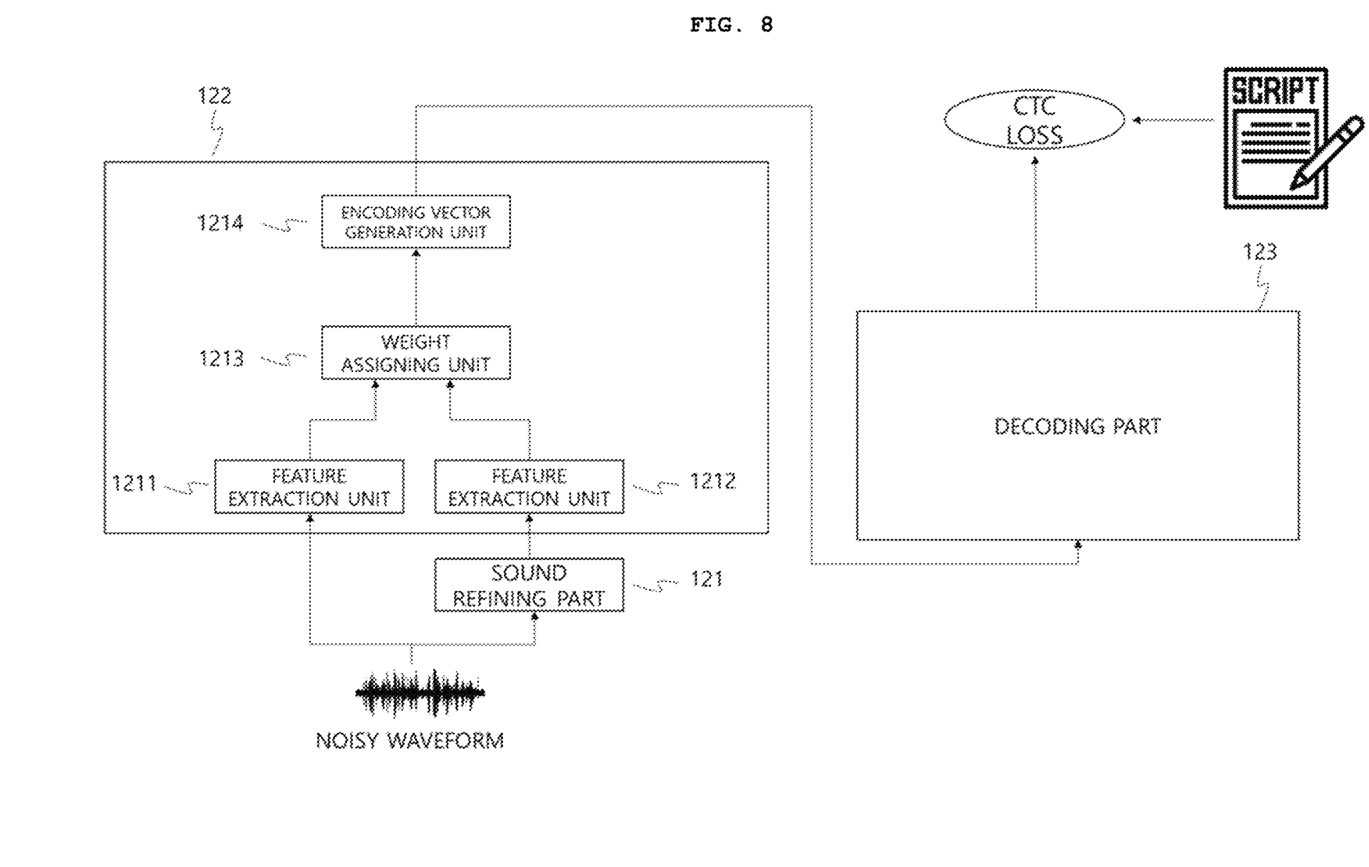
FIG. 8 conceptually illustrates a process for fine-tuning the STT model according to the embodiment.

FIGS. 7 and 8 illustrate an example of the learning process for the STT model according to the embodiment. It should be noted that FIGS. 7 and 8 are merely examples, and the learning process of the STT model is not limited to those illustrated in FIGS. 7 and 8.

First, the STT model may be trained using a self-supervised learning method. In the self-supervised learning method, a pre-training process and a fine-tuning process are performed.

In the pre-training process, a universal speech is used as training data. In other words, the training data used in the pre-training process is not limited to the speech that can be obtained at the dental clinic, but can be all kinds of speeches that can be obtained in everyday life.

Referring to FIG. 7, the pre-training process will be described in more detail. First, a universal speech without noise is obtained. This is illustrated as a clean waveform in FIG. 7. A plurality of the universal speeches can be easily acquired in daily life.

Noise can then be artificially added to the clean waveform, resulting in a noisy waveform. The noise is not limited to one type since there are various types of noise. Therefore, an infinite number of noisy waveforms can be obtained from a single universal speech.

In this way, training dataset required for the pre-training is prepared. In the training dataset, an input data for training is the noisy waveform, and a label data (target data) for training is the clean waveform.

Next, the input data for training is provided to the sound refining part 121 described above. Then, the noisy waveform is subjected to the noise cancelling process.

Next, the sound without the noise cancelling process and the sound with the noise cancelling process are respectively provided to the feature extraction unit 1211 and the feature extraction unit 1212 in the encoding part 122 shown in FIG. 7. In the feature extraction units 1211 and 1212, features are extracted from spectrograms that are obtained through the transformation as described above.

Next, the feature extracted from each of the feature extraction units 1211 and 1212 is provided to the weight assigning unit 1213. As a result, the weighted average value described above is calculated.

Next, the weighted average value is provided to the encoding vector generation unit 1214. The encoding vector is then generated as described above.

Meanwhile, the clean waveform serving as the label data for training is provided to a feature extraction unit 1223. A feature extracted from the feature extraction unit 1223 is provided to a vector quantization unit 1215, and vectors are generated from the vector quantization unit 1215. Here, the feature extraction unit 1223 may perform the same function as the feature extraction units 1211 and 1212. Further, the vector quantization unit 1215 may be configured to convert the feature extracted by the feature extraction unit 1223 into vectors.

Then, at least one of the sound refining part 121, the feature extraction units 1211 and 1212, the weight assigning unit 1213, and the encoding vector generation unit 1214 may be trained such that the difference between the encoding vector generated by the encoding vector generation unit 1214 and the vectors generated by the vector quantization unit 1215 is minimized. A backpropagation method may be used for training, but is not limited thereto. Here, the aforementioned difference may be contrastive loss. That is, the training can be performed to minimize the contrastive loss.

Here, this learning approach is referred to as self-supervised learning, because vast amounts of training datasets are generated by adding noises to the universal speech, and these training datasets are then used for training. Here, the noise serves as a kind of masking. That is, in the pre-training process, the training is performed to accurately extract vectors for speech despite the masking such as noise.

Next, the fine-tuning process will be described in detail with reference to FIG. 8. After at least one of the encoding part 122 and the sound refining part 121 is trained by the universal speech during the pre-training process, the dental-specific STT model is then targeted and the dental-specific sound is used for fine-tuning. Since the pre-training has already been performed with the universal speech, it is not necessary to have the large number of dental sounds required to achieve a desired recognition rate, i.e., the large number of data for training.

As for training data for fine-tuning, an input data for training includes sounds generated in the dental clinic. Such sounds may be generated during the dental treatment and, more specifically, the sounds may include speeches and noises generated during the dental treatment. Further, a label data for training may be a text such as a script for these speeches.

As shown in FIG. 8, the sound generated in the dental clinic is provided as the input data for training. The script for the speech of the sound is then provided as the label data for training. Specifically, the sound with the noise cancelling process is provided to the feature extraction unit 1212 via the sound refining part 121, and the sound without the noise cancelling process is provided to the feature extraction unit 1211. Then, the encoding vector is generated after the sound is processed through other components (the weight assigning unit 1213 and the encoding vector generation unit 1214) of the encoding part 122 shown in FIG. 8. The encoding vector thus generated is provided to the decoding part 123. The decoding part 123 generates a script through a decoding process. The generated script is then compared to the script serving as the label data for training. After the comparison, at least one of the sound refining part 121, each component of the encoding part 122, and the decoding part 123 is trained in order to minimize a difference between the generated script and the script serving as the label data for training. The difference may be referred to as Connectionist Temporal Classification (CTC) loss.

In other words, according to the embodiment, the features are extracted from the sound containing speech and noise and also from the refined result of such sound; the weighted average result is derived for the extracted features; an encoding vector is generated from the weighted average result; and the generated encoding vector is decoded to obtain the text.

Therefore, the speech can be recognized accurately even in a noisy environment. That is, it is possible to implement the STT model for dentistry with a high recognition rate.

Meanwhile, although not illustrated in FIGS. 5 and 6, a word correction model may be included in the decoding part 123. The word correction model is trained to recommend one of words in the dictionary as an input word if the input word is not in the dictionary. For example, 'n' consecutive words (where n is a natural number), including words that are not in the dictionary, can be inputted to the word correction model. Then, the word correction model recommends one of the words in the dictionary for the word that is not in the dictionary and outputs the one that recommended. Then, the word that is not in the dictionary and included in the script may be replaced with a word in the dictionary.

Here, the word correction model may be trained through a supervised learning method. For training, the input data for training may include a plurality of sets of 'n' words including words that are not in the dictionary. Further, the label data for training may include a plurality of words in the dictionary in which words that are not in the dictionary are replaced with words that are in the dictionary.

Here, the words that are not in the dictionary may be randomly generated. For example, words that are not in the dictionary may be created in a variety of ways, for example, by omitting one of the syllables that make up the word, by changing consonants, by changing vowels, and the like. Here, once created, they must be checked to see if they actually exist in the dictionary.

Further, the number 'n' described above may be any number such as three, but is not limited thereto.

While the above-described dental speech recognition device 100 has been described on the premise that it is implemented in a server and the speech recognized by the user terminal 200 is provided to the dental speech recognition device 100. However, the technical scope of the present disclosure is not limited thereto. For example, the dental speech recognition device 100 described above may be implemented in the user terminal 200. In this case, the dental-specific STT model may be implemented in a memory included in the user terminal 200 and run by the execution of a processor included in the user terminal 200. Thus, an STT model with the same performance as described above may be implemented.

In the above, the dental speech recognition device 100 according to the embodiment have been discussed. Hereinafter, a dental speech recognition method performed by the dental speech recognition device 100 will be described.

Figure 9:
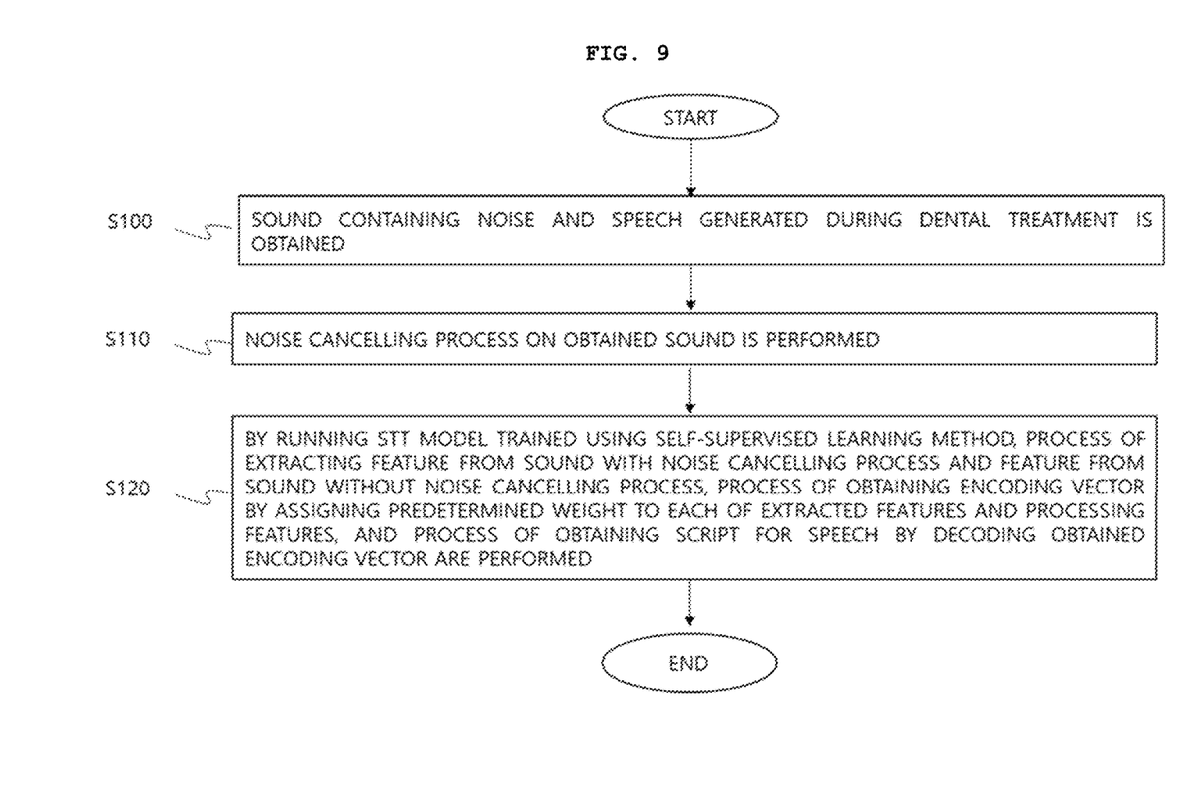
FIG. 9 illustrates an example of a flowchart for a dental speech recognition method according to the embodiment.

First, FIG. 9 illustrates an example of a flowchart for a dental speech recognition method according to the embodiment. Here, it should be noted that this flow chart is merely an example, and the present disclosure is not limited thereto. For example, depending on one embodiment, each step may be performed in a different order from that shown in FIG. 9, at least one step that is not shown in FIG. 9 may be additionally performed, or at least one of the steps shown in FIG. 9 may not be performed.

Referring to FIG. 9, in step S100, a sound containing noise and speech generated during a dental treatment is obtained.

Next, in step S110, a noise cancelling process on the obtained sound is performed so that the sound with the noise cancelling process and the sound without the noise cancelling process are generated.

Next, in step S120, by running the STT model trained using the self-supervised learning method, a process of extracting a feature from the sound with the noise cancelling process and a feature from the sound without the noise cancelling process, a process of obtaining an encoding vector by assigning a predetermined weight to each of the extracted features and processing the features, and a process of obtaining a script for the speech by decoding the obtained encoding vector are performed.

Here, the self-supervised learning method includes a fine-tuning process and, in the fine-tuning process, a plurality of sounds containing noises and speeches that are generated during the dental treatment and a script for each of the plurality of speeches are used as a training data.

Since the dental speech recognition method is performed by the dental speech recognition device 100 described above, redundant description thereof will be omitted.

The method according to the various embodiments described above may also be implemented in the form of a computer program stored on a computer-readable storage medium programmed to perform each of the steps of the method, and may also be implemented in the form of a computer-readable medium storing a computer program programmed to perform each of the steps of the method.

The above description illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

What is claimed is:

1. A speech recognition device for dentistry, comprising:
a processor; and
a memory that stores one or more instructions that, when executed by the processor, cause the processor to perform operations including:
obtaining a sound containing noise and speech generated during a dental treatment,
performing a noise cancelling process on the obtained sound so that the sound with the noise cancelling process and the sound without the noise cancelling process are generated, and
running a speech-to-text (STT) model trained using a self-supervised learning method,
wherein the STT model executes a process of extracting a feature from the sound with the noise cancelling process and a feature from the sound without the noise cancelling process,
a process of obtaining an encoding vector by assigning a predetermined weight to each of the extracted features and processing the features, and
a process of obtaining a script for the speech by decoding the obtained encoding vector,
wherein the self-supervised learning method includes a fine-tuning process and, in the fine-tuning process, a plurality of sounds containing noises and speeches that are generated during the dental treatment and a script for each of a plurality of speeches are used as a training data,
in a pre-training process for an encoding part included in the STT model, the noise cancelling process is performed on a sound containing speech and noise that serves as an input data for training so that the sound with the noise cancelling process and the sound without the noise cancelling process are generated,
a feature is extracted from the sound serving as the input data for training on which the noise cancelling process is not performed and a feature is extracted from the sound serving as the input data for training on which the noise cancelling process is performed,
an encoding vector for training is obtained by assigning a predetermined weight to each of the feature extracted from the sound serving as the input data for training on which the noise cancelling process is not performed and the feature extracted from the sound serving as the input data for training on which the noise cancelling process is performed, and processing the features, and
a training is performed such that a difference between the encoding vector for training and a feature vector is minimized, wherein the feature vector is converted from an extracted feature for label data for training.

2. The speech recognition device of claim 1, wherein the noise cancelling process is performed by a model that performs speech enhancement.

3. The speech recognition device of claim 1, wherein, in the noise cancelling process, at least one of spectral subtraction, Wiener filtering, and adaptive filtering is performed.

4. The speech recognition device of claim 1, wherein, in the process of extracting the feature from the sound with the noise cancelling process and the feature from the sound without the noise cancelling process, each of the sound with the noise cancelling process and the sound without the noise cancelling process is converted into a spectrogram, and
each of the features is extracted from the corresponding spectrogram by using a convolutional neural network.

5. The speech recognition device of claim 1, wherein the predetermined weight is assigned such that a higher value is assigned to a part that is relatively similar and a lower value is assigned to a part that is not relatively similar between the sound with the noise cancelling process and the sound without the noise cancelling process.

6. The speech recognition device of claim 1, wherein the encoding part performs the process of extracting the feature from the sound with the noise cancelling process and the feature from the sound without the noise cancelling process and the process of obtaining the encoding vector, and
wherein the encoding part is trained using a plurality of sounds containing speeches and noises through the pre-training process included in the self-supervised learning method.

7. The speech recognition device of claim 6, wherein, in the pre-training process for the encoding part, the sound containing the speech and the noise is used as the input data for training, and a sound containing the speech is used as the label data for training.

8. The speech recognition device of claim 1, wherein contrastive loss is used for the training performed to minimize the difference between the encoding vector for training and the feature vector.

9. The speech recognition device of claim 6, wherein a decoding part included in the STT model performs the process of obtaining the script for the speech by decoding the obtained encoding vector, and
in the fine-tuning process, a training is performed such that a difference between a result outputted from the decoding part and the script serving as the training data is minimized, the result being outputted in response to the encoding part being provided with the plurality of sounds containing the noises and the speeches generated during the dental treatment.

10. The speech recognition device of claim 9, wherein connectionist temporal classification (CTC) loss is used for the training performed to minimize the difference between the result outputted from the decoding part and the script serving as the training data.

11. The speech recognition device of claim 1, wherein the one or more instructions, when executed by the processor, cause the processor to provide, if the script includes a word that is not in a dictionary, three consecutive words including the word that is not in the dictionary to a trained word correction model, and
wherein the word that is not in the dictionary is replaced with a word corrected by the trained word correction model.

12. A speech recognition method for dentistry that is performed by a speech recognition device for dentistry, the speech recognition method comprising:
obtaining a sound containing noise and speech generated during a dental treatment;
performing a noise cancelling process on the obtained sound so that the sound with the noise cancelling process and the sound without the noise cancelling process are generated; and
running a speech-to-text (STT) model trained using a self-supervised learning method, the STT model executing a process of extracting a feature from the sound with the noise cancelling process and a feature from the sound without the noise cancelling process, a process of obtaining an encoding vector by assigning a predetermined weight to each of the extracted features and processing the features, and a process of obtaining a script for the speech by decoding the obtained encoding vector, wherein the self-supervised learning method includes a fine-tuning process and, in the fine-tuning process, a plurality of sounds containing noises and speeches that are generated during the dental treatment and a script for each of a plurality of speeches are used as a training data,
in a pre-training process for an encoding part included in the STT model, the noise cancelling process is performed on a sound containing speech and noise that serves as an input data for training so that the sound with the noise cancelling process and the sound without the noise cancelling process are generated,
a feature is extracted from the sound serving as the input data for training on which the noise cancelling process is not performed and a feature is extracted from the sound serving as the input data for training on which the noise cancelling process is performed,
an encoding vector for training is obtained by assigning a predetermined weight to each of the feature extracted from the sound serving as the input data for training on which the noise cancelling process is not performed and the feature extracted from the sound serving as the input data for training on which the noise cancelling process is performed, and processing the features, and
a training is performed such that a difference between the encoding vector for training and a feature vector is minimized, wherein the feature vector is converted from an extracted feature for label data for training.

13. The speech recognition method of claim 12, wherein the noise cancelling process is performed by a model that performs speech enhancement.

14. The speech recognition method of claim 12, wherein, in the noise cancelling process, at least one of spectral subtraction, Wiener filtering, and adaptive filtering is performed.

15. The speech recognition method of claim 12, wherein, in the process of extracting the feature from the sound with the noise cancelling process and the feature from the sound without the noise cancelling process, each of the sound with the noise cancelling process and the sound without the noise cancelling process is converted into a spectrogram, and
each of the features is extracted from the corresponding spectrogram by using a convolutional neural network.

16. The speech recognition method of claim 12, wherein the predetermined weight is assigned such that a higher value is assigned to a part that is relatively similar and a lower value is assigned to a part that is not relatively similar between the sound with the noise cancelling process and the sound without the noise cancelling process.

17. The speech recognition method of claim 12, wherein, in the pre-training process for the encoding part, the sound containing the speech and the noise is used as the input data for training, and a sound containing the speech is used as the label data for training.

18. A non-transitory computer-readable storage medium that stores a computer program including one or more instructions that, when executed by a processor of a computer, cause the computer to perform the speech recognition method of claim 12.

* * * * *